United States Patent Office
3,528,804
Patented Sept. 15, 1970

3,528,804
COPPER SEPARATION PROCESS
Ernst L. Th. M. Spitzer and Johannes Radder, Amsterdam, Netherlands, assignors to Shell Oil Company, New York, N.Y., a corporation of Delaware
No Drawing. Filed Dec. 22, 1967, Ser. No. 692,700
Claims priority, application Great Britain, Jan. 2, 1967, 102/67
Int. Cl. C22b 15/00; C07f 1/08
U.S. Cl. 75—117
7 Claims

ABSTRACT OF THE DISCLOSURE

Selective extraction of copper values from acidic aqueous solutions containing halide ions employs organic sulfide as the extracting agent.

BACKGROUND OF THE INVENTION

The extraction of metal values, that is, non-alkali metal salts or metal ions derived therefrom, from aqueous solutions of the metal salts is employed in numerous industrial processes, for example, in order to isolate or at least concentrate the desired metal values from dilute aqueous solutions. This procedure is in contrast to related processes which purify desired metal values by removing undesired metal compounds therefrom. The selective extraction of one metal value from others is of particular importance in the metallurgical industry where the starting materials are usually aqueous solutions of a number of metal values resulting from the leaching of ores with aqueous solutions of acids, bases or metal salts, after the ores have been brought into a suitable form by crushing, grinding, screening or the like. The metal values thus obtained are subjected to further treatments such as precipitation, electrolysis and/or pyrometallurgical processes.

SUMMARY OF THE INVENTION

It has now been found that relatively large proportions of copper values, such as are obtained from acid leaches of copper ores, are selectively extracted from aqueous, acidic, halide ion-containing solutions also containing iron values by the use of organic sulfides as extracting agents. In the present process, copper values are separated by liquid-liquid extraction from an acidic, aqueous medium containing, in addition to the copper values, halide ions and iron values, by contacting the medium with an organic sulfide in a liquid phase which is immiscible or only slightly miscible with the aqueous feed. The copper values thereby separated are subsequently recovered, if desired, from the organic sulfide-containing extract.

DESCRIPTION OF PREFERRED EMBODIMENTS

The extracting agent

The organic sulfide employed as the extracting agent is a dihydrocarbyl sulfide wherein the effective chain length is at least 6 but no more than 16, preferably from 7 to 10 inclusive. By the term "effective chain length" is meant the number of atoms other than hydrogen present in the longest continuous atomic chain which includes the sulfur atom of the dihydrocarbyl sulfide. By way of illustration, the effective chain length of di-n-butyl sulfide is 9 whereas the effective chain length of di-n-hexyl sulfide is 13. Preferred dihydrocarbyl sulfides of this character are dialkyl sulfides as illustrated by di-n-butyl sulfide, di-sec-butyl sulfide, diisoamyl sulfide, n-hexyl methyl sulfide and sec-octyl ethyl sulfide. Particularly satisfactory results are obtained through the use of di-n-butyl sulfide.

The organic sulfide extracting agent is employed in the liquid phase in the presence of or in the absence of an organic diluent immiscible or only partially miscible with water. When the organic sulfide is liquid under the conditions of the extraction process, no diluent is required and the preferred modifications of the process do not employ added diluent. In certain instances, however, the use of a diluent proves advantageous as when the organic sulfide is unduly soluble in the aqueous phase. In such instances, suitable diluents include halogenated hydrocarbons, e.g., chloroform, 1-2-dichloroethane, 1,2-dibromopropane, bromoform and carbon tetrachloride; and hydrocarbons, aliphatic or aromatic, such as dodecane, decahydronaphthalene and benzene, or mixtures of hydrocarbons such as kerosene and other petroleum fractions.

The phase containing the organic sulfide, whether or not diluent is present, should be sparingly miscible, if at all miscible, in the aqueous phase to be extracted. The miscibility of either phase in the other should not exceed 5% by volume and preferably is less than 1% by volume.

The aqueous feed

The aqueous phase from which the copper values are selectively extracted contains, in addition to the copper and iron values, excess halide ions and sufficient acid to render the aqueous solution acidic.

Under otherwise comparable conditions, it has been found that the efficiency of the extraction process increases with increased acidity of the solution. For efficient separation, the aqueous solution should contain at least 0.1 gram equivalent of hydrogen ion per liter of solution, i.e., the solution should have a pH of 1 or less, preferably about 0.6 or less.

The halide ions present in the aqueous solution, which are preferably chloride ions, are present to the extent of from about 2 gram-equivalents per liter to about 6 gram-equivalents per liter, preferably from about 3 gram-equivalents per liter to about 5 gram-equivalents per liter. The concentration of halide ion has been found to be somewhat critical, as too great a halide ion concentration results in a loss of selectivity in the extraction of the copper values from the aqueous solution containing iron values.

The halide ions and the desired acidity are provided in any convenient form. In one modification, the aqueous feed is rendered acidic with halide-free mineral acid, e.g., sulfuric acid, and halide ion is provided as the soluble alkali metal halide salt, e.g., sodium chloride of potassium chloride. In an alternate and generally preferred modification, the hydrogen ion and halide ion are together provided as the hydrohalic acid, e.g., hydrochloric acid. Particularly useful results are obtained when the aqueous solution is from about 2 N to about 6 N, preferably from about 3 N to about 5 N, in hydrochloric acid.

The process of the invention is particularly applied to the selective extraction of copper(II or cupric values from acidic aqueous solutions also containing iron(III) or ferric values. This in in contrast to the generally observed sequence of metal extraction wherein iron values are typically extracted from a mixture also containing copper. The relative amounts of iron and copper values are not critical to the extraction process and relatively minor copper values are suitably selectively extracted from solutions containing relatively major proportions of iron values. Thus, the process of selective extraction is of importance in mining industries where it is necessary to recover copper values from leaches of copper ores which as a rule contain iron as well, often in preponderant amounts. The extraction of copper values without the necessity of first removing the iron salts results in an important economic saving.

The extraction process is conducted by contacting the organic sulfide extracting agent and the acidic, aqueous feed, the relative proportions of which are not critical, in a batch-type or in a continuous process. In the latter modification, a several-stage continuous counter current extraction is preferred. In any modification, agitation is provided during the process to insure adequate phase contact. This agitation, frequently in the form of vigorous stirring, is usually continued until equilibrium between the phases is established, generally a period of several minutes. Any emulsion which may form is broken, if required, in conventional manner by adding demulsifying agents such as alcohols. Troublesome emulsions are not frequently encountered, however, and the extraction proceeds smoothly, as a rule, at ambient or any other convenient temperature at which the aqueous feed and the extracting agent are liquid.

If desired, the extracted copper values are separated from the organic extract as by treatment of the separated organic phase with water or dilute mineral acid, whereupon the copper values return to an aqueous phase. The organic phase containing the sulfide is suitably recycled whereas the copper values are recovered from the aqueous phase as by solvent evaporation.

The iron values and any other metal values remaining in the aqueous raffinate subsequent to extraction with the organic sulfide-containing extracting agent are recovered, if desired, by other selective extractions involving other extracting agents.

To further illustrate the improved process of the invention, the following examples are provided. It should be understood that the details thereof are not to be regarded as limitations, as they may be varied as will be understood by one skilled in this art.

*Example I.*—The separations of this and the following example were conducted in a graduated, straight-wall separatory funnel with a 1-liter capacity. The top opening served to admit a double-paddle stirrer as well as the aqueous feed and the extracting agent.

As the aqueous feed were employed solutions containing 18.6 g. of ferric ion and 25.4 g. of cupric ion per liter in the form of their chlorides, to which varying amounts of hydrochloric acid were added. After addition of the indicated organic sulfide to give a phase ratio of 1, the resulting mixture was stirred vigorously for one minute at room temperature. Subsequently, the phases were separated and the extracted metal values were removed from the organic extract with water. By analysis of the resulting aqueous phase, the quantities of the extracted metal values were determined. The results of several extraction processes are given in Table I.

TABLE I

| Normality of HCl in aqueous feed | Di-sec-butyl sulfide, percent wt. extracted per pass | | Di-n-butyl sulfide, percent wt. extracted per pass | | Diisoamyl sulfide, percent wt. extracted per pass | |
|---|---|---|---|---|---|---|
| | Cu | Fe | Cu | Fe | Cu | Fe |
| 3 | 1.3 | 0.04 | 6.9 | 0 | 0.8 | 0.4 |
| 4 | 3.4 | 0.33 | 21 | 2.8 | 15 | 1.6 |
| 5 | 6.7 | 0.36 | | | 24 | 2.6 |
| 6 | 16.0 | 4.3 | 64 | 56 | | |
| 8 | | | 81 | 80 | | |

*Example II.*—A solution which was 0.3 N in sulfuric acid contained 18.4 g. of ferric ion as the sulfate and 25.4 g. of cupric ion as the sulfate. Extraction of this solution was conducted with di-n-butyl sulfide subsequent to the addition of 3 moles per liter of sodium chloride to the solution. The volume ratio of the phases was 1. The extraction removed 18.5% by weight of the copper but only 1.5% by weight of the iron values per pass.

We claim as our invention:
1. The process of selectively extracting copper values from an acidic, aqueous phase also containing iron values by (1) intimately contacting said aqueous phase additionally containing from about 2 gram-equivalent weights per liter to about 6 gram-equivalent weights per liter of halide ions and having a pH of 1 or less, with a sparingly miscible organic phase consisting essentially of dihydrocarbyl sulfide, and (2) separating from the resulting phase mixture the dihydrocarbyl sulfide-containing extract enriched in said copper values.

2. The process of claim 1 wherein said dihydrocarbyl sulfide is dialkyl sulfide of an effective chain length of from 6 to 16 and the halide ions present in said aqueous phase are chloride ions.

3. The process of claim 2 wherein the chloride ions are provided as hydrochloric acid.

4. The process of claim 2 wherein the chloride ions are provided as alkali metal chloride.

5. The process of claim 2 wherein the dialkyl sulfide is di-n-butyl sulfide.

6. The process of claim 2 wherein the dialkyl sulfide is di-sec-butyl sulfide.

7. The process of claim 2 wherein the dialkyl sulfide is diisoamyl sulfide.

References Cited
UNITED STATES PATENTS

| 2,694,618 | 11/1954 | Gillson et al. | 23—125 |
| 2,993,923 | 7/1961 | Warner et al. | 260—438 |
| 2,998,442 | 8/1961 | Allais et al. | 260—438 |

OTHER REFERENCES

Smith, R. L.: The Sequestration of Metals; Chapman & Hall Ltd., London; 1959; pp. 26–27, 30, 45–46 and 60.

OSCAR R. VERTIZ, Primary Examiner

G. O. PETERS, Assistant Examiner

U.S. Cl. X.R.

75—101; 23—312; 260—438